April 19, 1960
H. L. PRESCOTT ET AL
2,933,671
PARALLELING CIRCUIT FOR LOAD TAP CHANGERS
Filed April 12, 1957
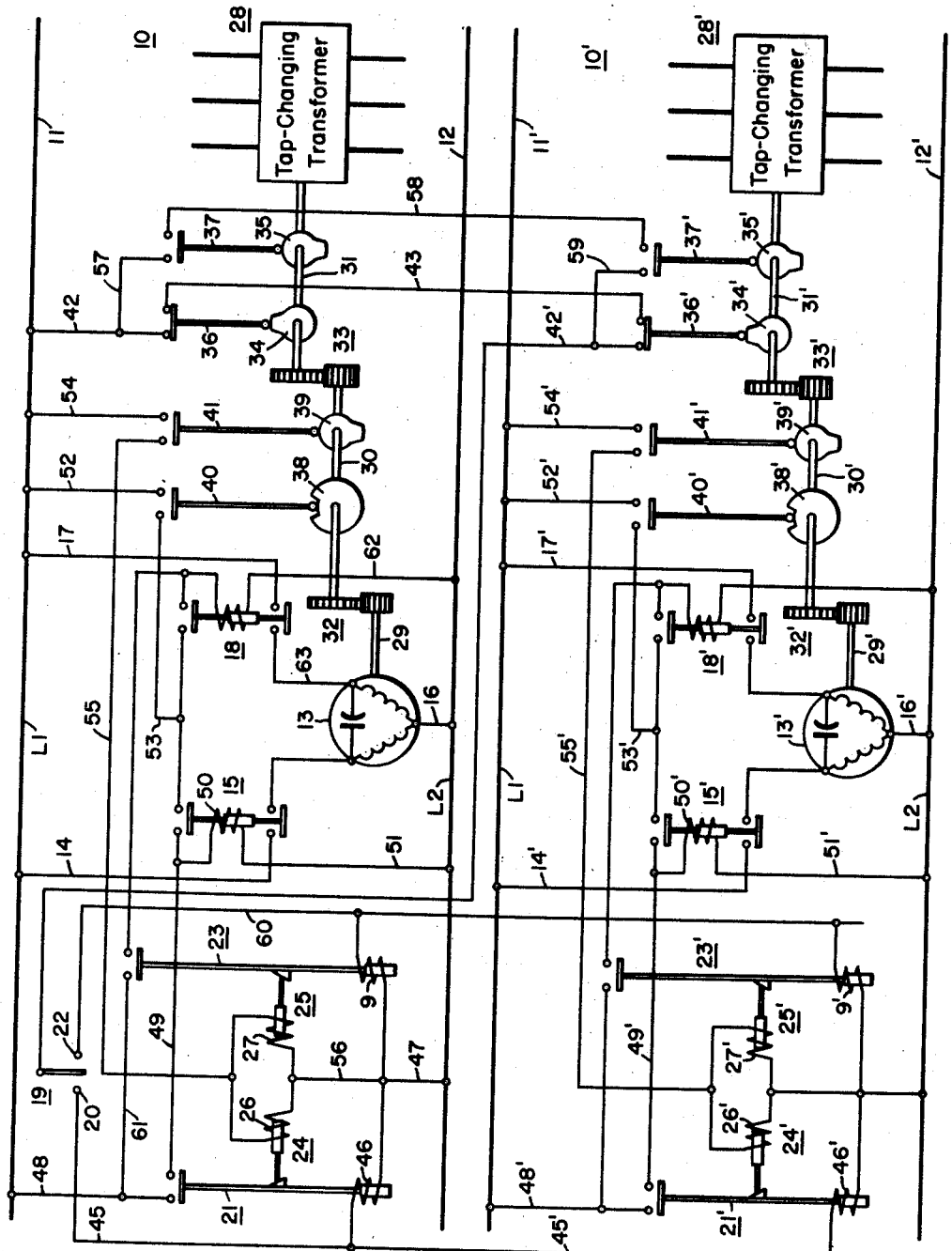
WITNESSES
INVENTORS
Herbert L. Prescott &
Wendell L. Erickson.
BY
ATTORNEY

United States Patent Office 2,933,671
Patented Apr. 19, 1960

2,933,671

PARALLELING CIRCUIT FOR LOAD TAP CHANGERS

Herbert L. Prescott, South Pymatuning Township, Mercer County, Pa., and Wendell L. Erickson, Dexter Township, Washtenaw County, Mich., assignors to Westinghouse Electric Corporation, East Pittsburgh, Pa., a corporation of Pennsylvania Application April 12, 1957, Serial No. 652,587

5 Claims. (Cl. 323—43.5)

The invention relates generally to tap changers and, more particularly, to paralleling circuit systems for load tap changers.

In the operation of load tap changers, it often happens that one tap changer will get ahead of another tap changer and cause difficulty in the operation. This results from paralleling circuit systems which are not provided with means interrupting the leading tap changer until the lagging tap changer catches up.

The object of the invention is to provide for keeping all of the load tap changers of a paralleling circuit system for load tap changers operating in a predetermined relationship to one another.

It is also an object of the invention to provide for stopping any tap changer operating in a paralleling circuit system for load tap changers when it leads to permit another tap changer to reach a corresponding position before the leading tap changer is again set in operation.

Other objects of the invention will, in part, be obvious and will, in part, appear hereinafter.

The invention accordingly comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing, in which the circuit diagram illustrates a paralleling circuit system embodying the features of the invention.

In the tap changer paralleling system illustrated, two main circuits are provided for supplying power to the two tap changer motors and for the control. Since the two main circuits are almost identical, like elements will be given corresponding numbers. The legends applied to the lower circuit system will be distinguished from the ones in the other circuits by the addition of the legend prime (').

The upper circuit system, which we shall designate generally as 10, is supplied by two main circuit conductors 11 and 12, while the lower circuit system, which will be identified generally as 10', is connected to two main circuit conductors 11' and 12'. The power circuits comprising the conductors 11 and 12 for the circuit system 10 and 11' and 12' for the circuit system 10' will be supplied from any suitable power source (not shown). The circuit conductors may be connected to one another and to a common ground or each to a common ground. The voltage of the power source will depend on the specifications of the tap changer motors and the control systems. Since the two tap changers and their control systems are substantially the same, it will suffice to describe the arrangement and functioning of one system.

The tap changer system 10 comprises motor 13 and means for connecting it across the power lines 11 and 12. This motor will be of any of the well-known types utilized for driving tap changers. In the one illustrated, a plurality of windings connected to one another at one end and having a capacitor disposed between the other terminals is employed. This type of motor is similar to the motor employed in Patent 2,447,634, issued August 24, 1948. As shown, one of the windings of the motor 13 is connected through conductor 14 and relay switch shown generally at 15 to the main circuit conductor 11 and to the other line conductor 12 through conductor 16. The other winding of the motor 13 is connected through conductor 17, relay switch shown generally at 18, to the main line conductor 11 and through conductor 16 to the line conductor 12. A relay switch 15 is provided to connect the motor to turn in one direction while another relay switch 18 will connect the motor to turn in the opposite direction.

A relay switch shown generally at 19 is provided for closing the control circuits when it is desired to put the tap changers in operation. In this particular embodiment of the invention, a two-way manually operated switch is provided, but it is to be understood that any other type of switch well known in this art may be utilized.

When the switch 19 is thrown to the left into engagement with terminal 20, an actuating circuit will be established for the forward relay switch 21. When it is thrown to the right into engagement with terminal 22, a circuit will be established for the reverse relay switch 23. Each of these switches 21 and 23 will be provided with a latching device shown generally at 24 and 25, respectively. The latches 24 and 25 will lock the switches 21 and 23 closed. Switches of this type are well known in the art. In the embodiment illustrated, a plunger type of latch is illustrated which will engage under the catches provided on the switch members 21 and 23. The operation of the switch members 21 and 23 may be effected by means of the electromagnetic windings 46 and 9, the circuits for which will be described hereinafter.

The tap changer 28, which may be utilized to perform any tap changing operation, is driven by a motor 13. The drive is effected through a plurality of shafts and gears which, in this instance, comprises three shafts 29, 30 and 31 and two trains of gears 32 and 33. Two cams 34 and 35 are provided on the shaft 31. These cams are utilized for actuating switches. The cam 34 closes switch 36 when the tap changer 28 stands in one predetermined position, and the switch 37 is closed by cam 35 when the tap changer stands in a different predetermined position. The setting of these cams on the shaft will depend on the design of the tap changer 28 and its operating mechanism.

Two other switch operating cams 38 and 39 are mounted on the shaft 30. These cams operate switches 40 and 41, respectively. As will be observed, the cam 38 will maintain the switch 40 closed during the major portion of one revolution of shaft 30. The cam 39 will permit the switch 41 to stand open during the major portion of a revolution of shaft 30. The design of these cams may be readily made by anyone skilled in the art knowing the specifications to be met. The gear train, shown generally at 32, can be designed to drive the cams at any predetermined speed relative to the motor speed. The gear train 33 will be designed in accordance with the speed at which it is desired to drive the shaft 30 in relation to the speed of the tap-changer shaft 31.

Assuming now that it is desired to initiate the operation of the motor 13 to drive the tap changer, then the switch 19 will be thrown to the left into contact with the terminal 20. A circuit will be established from the line conductor 11 through conductor 42, the contact member of the switch 36, conductor 43, the contact member of switch 36', conductor 42', switch 19, conductor 45, the actuating coil 46 of the switch 21, and conductor 47 to the line conductor 12. While the circuit 10' will be described in detail hereinafter, it may give a clearer picture of the overall operation if it is pointed out here that the actuating coil 46' is energized at the same time as the actuating coil 46 to close switch 21 to initiate the operation of the motor 13'.

The switch 21 will be actuated to closed position to establish a switch actuating circuit which extends from the line conductor 11 through conductor 48, the contact member of switch 21, conductor 49, the actuating coil 50 of switch 15 ond conductor 51 to the line conductor 12. The switch 21, when actuated, will be latched or locked closed by the latching device 24. Therefore, the actuating circuit for the relay switch 15 will be maintained until the switch 21 is tripped.

When the relay switch 15 is actuated, a motor circuit is established. The motor circuit extends from the line conductor 11 through conductor 14, the contact member of the relay switch 15, the left winding of the motor 13 and conductor 16 to the line conductor 12.

When the motor begins to rotate, the shafts 29, 30 and 31 will be driven. The rotation of the shaft 30 drives the cams 38 and 39. Almost immediately, the cam 38 will close the switch 40. This establishes a holding circuit for the relay switch 15. The holding circuit extends from the line conductor 11, through conductor 52, the contact member of the switch 40, conductor 53, the upper contact member on the relay switch 15, the actuating coil 50 of the relay switch 15 and conductor 51 to the line conductor 12. The motor circuit will be maintained even if the switch 21 is tripped.

Shortly after the closing of the switch 40, the switch 36 will open as a result of the rotation of the cam 34. The opening of the switch 36 will result in the opening of the energizing circuit for the actuating coil 46 of the relay switch 21. However, the relay switch 21 will not open when the energizing circuit is interrupted because it is latched closed by the latching device 24.

When the cam 39 has rotated half a revolution, it will close the switch 41. As soon as the switch 41 is closed, an actuating circuit for the locking device 24 is established. This circuit may be traced from the line conductor 11 through conductor 54, the contact member of the switch 41, conductor 55, the actuating coil 26 of the latching device 24, conductors 56 and 47 to the line conductor 12. The tripping of the latching device 24 permits the switch 21 to open.

As pointed out hereinbefore, the circuit system 10' is the same as the circuit system 10. The two systems cooperate since the switches 36 and 36' are both employed to control the initiating circuit for closing the motor circuit. Further, the actuating circuit for the switch 21' is connected in parallel circuit relationship with the actuating circuit for the switch 21.

Assuming now that the tap changers 28 and 28' are in operation, but that the tap changer 28' begins to lag behind the tap changer 28, then something must occur in the system to bring the tap changers into corresponding positions or as otherwise described, in step.

Since the tap changer 28 is leading, the motor drive will advance the cam 38 to the position illustrated and the switch 40 will drop open. This interrupts the holding circuit for the relay switch 15. It drops out interrupting the motor circuit through its lower contact member. The motor stops. Since the cam 34' has not reached a position corresponding to the position of the cam 34, the switch 36' will stand open. Consequently, the initiating circuit for starting the motor 13 will not function. Therefore, the tap changer 28 will not advance until such time as the cam 34' has been actuated into a position to close the switch 36'. When the cam 34' reaches a position to close the switch 36', the two tap changers will again be in step.

As soon as the switches 36 and 36' stand closed, the initiating circuit for both circuit systems 10 and 10' will be established in the manner described for the circuit system 10 hereinbefore, and both motors will again be started. When the motors are started, if the tap changers do not operate in step with one another, the circuit systems will again be interrupted until the lagging tap changer catches up with the leading tap changer.

Assuming that the tap changer 28 leads again after they have been brought into step on the first interruption, then as it advances from the position illustrated, the switch 40 will be closed establishing a holding circuit for the relay 15. Next, the switch 41 is closed by the cam 39 closing the tripping circuit for the latch 24. This results in the opening of switch 21.

The switch 37 is closed by cam 35. This switch is one link in the actuating circuit for the switches 46 and 46' which cooperates in setting of the initiating circuits for the motors 13 and 13'. However, the switch 37' will not be closed since the tap changer 28' is lagging behind the tap changer 28.

It is to be noted that at the time that switch 37 is closed, the cam 38 has advanced to the position where it drops out switch 40 and interrupts the holding circuit for the relay 15. The supply circuit for the motor 13 is interrupted and the motor stops. The tap changer 28 waits in this next position until tap changer 28' reaches a corresponding position. As soon as tap changer 28' gets into step with tap changer 28, the cam 35' closes switch 37'. The initiating circuit is now completed and the two motors are in operation again.

The tap changers 28 and 28' are caused to advance from position to position in either direction by the alternate operation of the switches 36 or 36' and 37 or 37'. The circuits established by the operation of these switches can easily be followed by reference to the description given hereinbefore.

It will be readily appreciated that any number of tap changers may be operated in step by providing additional circuit systems similar to 10 and 10' and connecting the switches corresponding to 36 and 36' to control the initiating circuit.

If it is desired to operate the tap changers in the opposite direction, the two-way switch 19 will be thrown to the right and the switch arm will engage the contact member 22. A control circuit is now established from the line conductor 11 through conductors 42 and 57, the contact member of switch 37, conductor 58, contact member of switch 37', conductors 59 and 42', switch 19, conductor 60, the actuating coil of switch 23, and conductor 47, to the line conductor 12. Switch 23 is actuated to its closed position and latched in that position by the latching member 25.

On the closing of switch 23, the circuit is established from line conductor 11 through conductors 48 and 61, contact member 23, the actuating coil of relay 18, conductor 62, to the line conductor 12. The relay 18 is moved upwardly closing the motor circuit. The motor circuit may be traced from line conductor 11 through the conductor 17, the contact member of relay 18, conductor 63, one of the windings of motor 13 and conductor 16 to the line conductor 12. The motor will now operate in the reverse direction driving the tap changer in the reverse direction. Corresponding circuits will be established for the tap changer system 10', and tap changer 28' will be operated in step with tap changer 28 and in the reverse direction. If one of the tap changers lags, the other will be stopped until the lagging tap changer is moved into a corresponding position.

Since certain changes may be made in the above construction and different embodiments of the invention could be made without departing from the scope thereof, it is intended that all matter contained in the above description or shown in the accompanying drawing shall be interpreted as illustrative and not in a limiting sense.

We claim as our invention:

1. In a paralleling circuit system for load tap changers, in combination, a plurality of load tap changers disposed to perform tap changing operations, a motor for driving each tap changer, means for initiating the operation of all the motors at the same time to drive the tap changers, means for locking the initiating means in operative position, means for establishing a holding circuit for the motor circuit to keep the motor in operation under predetermined operating conditions, interrupting means for rendering the means for initiating the operation of the motors ineffective at predetermined times during the operation of the tap changers, the interrupting means being dependent for its operation on all of the mechanisms for driving the tap changer, whereby when one of the tap changers falls behind another tap changer, the operation of the initiating means will be interrupted and remain interrupted until the tap changer mechanism that has fallen behind has advanced and reached a position corresponding to the tap changer which has had the operation of its mechanism interrupted.

2. In a paralleling circuit system for load tap changers, in combination, a plurality of load tap changers disposed to perform tap changing operations, a motor for driving each tap changer, a circuit disposed to initiate the operation of each motor for each tap changer at the same time, means for locking the initiating means in its active position, a holding circuit for each motor, means for closing the holding circuit for each motor, means for interrupting the holding circuit for each motor actuated in response to the operating mechanism for each tap changer, the means for interrupting the holding circuit of one tap changer being interconnected with the holding circuit for another tap changer, whereby when the tap changers do not occupy corresponding positions, the initiating circuit is interrupted and means actuated by each tap changer for interrupting the holding circuit of the motor, whereby the tap changer actuating mechanism of the leading tap changer is stopped to permit another tap changer to catch up and occupy a corresponding position to the leading tap changer, and means for effecting the operation of the initiating means when the tap changers stand in corresponding positions.

3. In a paralleling circuit system for load tap changers, in combination, a plurality of load tap changers disposed to perform tap changing operations, a motor for each load tap changer, tap changer driving mechanisms disposed between the motors and the tap changers, means for initiating the operation of all the motors at the same time, means for locking the initiating means for continuous operation, means provided in conjunction with each driving means for tripping the locking means at a predetermined time in the operation, and means operated by the actuating mechanism of each tap changer for interrupting the operation of each motor of the tap changer that gets ahead of another tap changer, the tripping means for the initiating means of the lagging tap changer serving to maintain the initiating means inactive until the tap changer mechanisms reach corresponding positions, whereby the tap changer mechanisms are operated in a predetermined relationship to one another.

4. In a paralleling circuit system for load tap changers, in combination, a plurality of load tap changers each having a plurality of positions, a motor for driving each tap changer, means for initiating the operation of all the motors at the same time to drive the tap changers, means for locking the initiating means in an operative position, means for establishing a holding circuit for the motor circuit of each tap changer to keep the motor in operation under predetermined operating conditions, first cam switch means driven by each of said motors for releasing said locking means and rendering said initiating means inoperative during the operation of said motors, second cam switch means driven by each of said motors and associated with alternate positions of each of said tap changers for maintaining said initiating means in an inoperative condition until all tap changers have reached corresponding positions, and means for interrupting the holding circuit of each of said motors at a predetermined position of each of said tap changers to stop said motors.

5. In a paralleling circuit system for load tap changers, in combination, a plurality of load tap changers each having a plurality of positions, a motor for driving each tap changer, relay means for initiating the operation of all the motors at the same time to drive the tap changers, latching means for locking said relay means in an operative position, a holding circuit including first cam switch means actuated by each motor, said holding circuit being connected to each of said motors for maintaining said motors in an operating condition under predetermined operating conditions, second cam switch means driven by each of said motors for releasing said latching means and rendering said relay means inoperative during the operation of said motors, and third cam switch means driven by each of said motors and associated with alternate positions of said tap changers for maintaining said relay means inoperative until all tap changers have reached corresponding positions, said third cam switch means being connected in circuit relation with said relay means.

References Cited in the file of this patent

UNITED STATES PATENTS

| | | |
|---|---|---|
| 1,970,389 | Minneci | Aug. 14, 1934 |
| 2,512,989 | Aicher | June 27, 1950 |
| 2,677,795 | Nielsen | May 4, 1954 |
| 2,772,369 | Pinney | Nov. 27, 1956 |